US008943745B2

(12) United States Patent
Sexton et al.

(10) Patent No.: US 8,943,745 B2
(45) Date of Patent: Feb. 3, 2015

(54) HANDHELD POLLEN SIFTER DEVICE

(76) Inventors: David Sexton, Ruffs Dale, PA (US); Jason Bruce, Braddock, PA (US)

(*) Notice: Subject to any disclaimer, the term of this patent is extended or adjusted under 35 U.S.C. 154(b) by 202 days.

(21) Appl. No.: 13/409,218

(22) Filed: Mar. 1, 2012

(65) Prior Publication Data
US 2012/0297671 A1 Nov. 29, 2012

Related U.S. Application Data

(60) Provisional application No. 61/489,529, filed on May 24, 2011.

(51) Int. Cl.
*A01G 7/00* (2006.01)

(52) U.S. Cl.
CPC .......................................... *A01G 7/00* (2013.01)
USPC .......................................................... 47/1.41

(58) Field of Classification Search
USPC ................... 47/1.41; 221/200, 204; 209/420; 222/189.05, 196, 196.2, 196.5, 198, 222/200, 333
IPC ...................................... A01G 7/00; A01H 1/02
See application file for complete search history.

(56) References Cited

U.S. PATENT DOCUMENTS

| 2,412,840 A | * | 12/1946 | Snyder | 209/347 |
| 2,548,487 A | | 4/1951 | Marchant | |
| 2,664,201 A | * | 12/1953 | Dunn | 209/332 |
| 2,922,523 A | * | 1/1960 | Griparis | 209/327 |
| 3,943,660 A | | 3/1976 | Hosaka | |
| 3,964,646 A | * | 6/1976 | Yazawa et al. | 222/189.05 |
| 4,534,858 A | * | 8/1985 | Aldrich et al. | 209/236 |
| 4,751,791 A | | 6/1988 | Al-Rawi | |

FOREIGN PATENT DOCUMENTS

| JP | 09103204 A | * | 4/1997 | A01H 1/02 |
| JP | 2003289735 A | * | 10/2003 | A01H 1/02 |

OTHER PUBLICATIONS

Machine translation of JP 09103204 to Totsuka, published Apr. 1997.*
Machine translation of JP 2003289735 to Tanaka, published Oct. 2003.*

* cited by examiner

*Primary Examiner* — Son T Nguyen
*Assistant Examiner* — Kathleen Alker
(74) *Attorney, Agent, or Firm* — Daniel Boudwin; Global Intellectual Property Agency LLC

(57) ABSTRACT

A handheld, vibrating pollen sifter device is disclosed having a handle portion, a vibrating motor, an enclosure for storing pollen generating plants and a screen for dispensing the liberated pollen therefrom onto a target plant. The vibrating motor disturbs the pollen grains from the stamen of flowers placed within the enclosure. The pollen is then liberated into the air through the screen at the base of the enclosure, providing a means to fertilize a plant abiotically. The motor is electrically driven by a power means, preferably a battery pack to allow improved mobility outdoors. An embodiment of the device utilizes a vibratory wand attached to a fine-mesh sifter bowl at its distal end that supports the flower stamen.

6 Claims, 3 Drawing Sheets

US 8,943,745 B2

HANDHELD POLLEN SIFTER DEVICE

CROSS REFERENCE TO RELATED APPLICATION

This application claims the benefit of U.S. Provisional Application No. 61/489,529 filed on May 24, 2011, entitled "Pollen Sifter—Resin Separator."

BACKGROUND OF THE INVENTION

1. Field of the Invention

The present invention relates to sifting devices and plant pollinators. More specifically, the present invention pertains to a vibratory sifting device for the purpose of liberating pollen from stamen of collected plant articles and distributing the sifted pollen onto a target plant for fertilization. The device comprises a vibratory motor, an enclosure or support for collected plant articles, and a screen for dispensing loose pollen directly onto the stigma or ovule of target plants for fertilization.

Biotic pollination is the process whereby pollen is transferred between plants by means of an external biological carrier, which allows fertilization to take place without the plant having a natural means to spread its own pollen. The process begins when the carrier, such as a bee, bird or similar biological organism, comes into contact with the pollen-generating stamen of a first plant and transfers the pollen that becomes attached thereto to the stigma of another plant. The pollen attaches to the carrier through physical contact and electrostatic cling, while the movement of the organism between different plants allows for fertilization and sexual reproduction of many plants.

A recent development in pollinator decline has been tracked and studied in the past several decades. This decline has marked a significant threat to the ability of flowering plant species to propagate reproduce and facilitate genetic diversity through cross pollination. Carrier species spread pollen over considerable distances, ensuring plants reproduce with partner plants over wide ranges and not in localized areas. As the population of certain pollinators, particularly bees and similar insects, declines, the ability of these plants to reproduce is significantly impacted.

2. Description of the Prior Art

Devices have been developed and disclosed in the prior art that are related to the collection of pollen from carrier animals, as well as those that are adapted to spread pollen manually from one flowering plant to another. Collection devices are generally related to beekeeping activities and the collection of pollen therefrom, while the pollen spreaders are generally air pressure devices that force a pollen/air mixture onto a target flower for fertilization purposes. These devices, while suited for their particular requirements and fulfilling a need in the art, fail to disclose a device as described by the present invention.

The present invention comprises a handheld, vibratory sifting device, wherein an enclosure of flowering plant articles are disturbed to separate and spread the pollen generated therefrom. A screen at the base of the enclosure allows the user to spread the pollen manually, which is sifted therethrough and separated from its originating plant. Above the enclosure is a motorized vibrating device with a user handle. The device sends vibrations through the enclosure to separate the pollen from the plants, which allows the user to collect or spread the pollen for manual fertilization without a natural carrier. Cross-pollination across different plants can be accomplished and controlled, ensuring strong genetic diversity and healthy plant growth.

Devices in the art related to pollen dispersement and manual pollination include U.S. Pat. No. 3,943,660 to Hosaka, which discloses a hand-held pollinator comprising a casing with a pump mechanism mounted therein. A pollen storage container is removably attached to the casing while a discharge conduit extends from the pump to the chamber for pressurization. A nozzle permits a pressurized stream of pollen to be expelled from the chamber upon pressurization and discharged into the airstream for distribution onto a target plant. The house includes a power source, a trigger for operation and a motor to operate the pump. The Hosaka device is ideal for dispensing a volume of granulated pollen stored within the storage container. It is not adapted to separate pollen from flowering plants and discharging the pollen with the same mechanism. An amount of processed or retrieved pollen must be placed into the container, as opposed to a volume of pollen generating plants ready for pollen separation due to induced vibration.

U.S. Pat. No. 2,548,487 to Marchant discloses a pollenizing device for spreading pollen for fertilization purposes. The device comprises pole formed with a longitudinal tube that runs the length of the pole. The proximal end of the tube terminates in a bulb pump, which is depressible to force air into the tube and out through the distal end of the pole. Along the length of the tube is a hopper for loading granular pollen thereinto. The pollen is fed into the tube, and the pressure from the bulb pump forces its contents out through the working end of the tube and onto a plant specimen. The Marchant device is similar to the Hosaka device, wherein a pressure driven device is disclosed for spreading granular pollen. The Marchant device is provided in an elongated pole form, particularly suited for fertilizing fruit trees and other plants out of reach of a user. The present invention, alternatively, separates pollen from its originating flower through vibratory excitation. After separation, the loose pollen is dispersed through a screen attached to the enclosure housing the flowering plants and separated pollen.

Finally, U.S. Pat. No. 4,751,791 to Al-Rawi discloses a plant duster and dispenser of pollen, comprising a small tube for dispensing the pollen dust and a container housing the pollen prior to dispensation. A tubular air pump having threads pumps air through the tube sections to the container, whereby to entrain the dust and dispense the dust through the provided small tube. Similar to the aforementioned patents, the Al-Rawi device utilizes an air pump as a means to deliver granulated pollen dust from a container and through a tube. The device is not suited for the same purpose or intent as the present invention, which is operable with flowering plants prior to pollen extraction.

The present invention is a pollinator device and pollen dust sifter that comprises a vibrating enclosure housing flowering plants, whereby induced vibration on the enclosure separates the pollen from the stamen of the plants. The resulting liberated pollen dust is then communicated through a sifter screen at the base of the enclosure, while the user controls the sifting process via a hand-held grip along the top of the enclosure. A further embodiment of the sifter device employs a wand vibrating tool attached to a sifting bowl at its distal end, providing a smaller means to extract and dispense pollen dust. The design of the present invention and its embodiments substantially diverge in elements from the prior art. Consequently it is clear that there is a need in the art for an improvement to existing pollinator devices. In this regard the instant invention substantially fulfills these needs.

SUMMARY OF THE INVENTION

In view of the foregoing disadvantages inherent in the known types of pollinator devices now present in the prior art, the present invention provides a new pollinator devices wherein the same can be utilized for providing convenience for the user when separating and dispensing pollen dust from flowering plants using vibratory input.

It is therefore an object of the present invention to provide a new and improved pollinator device that has all of the advantages of the prior art and none of the disadvantages.

Another object of the present invention to provide a vibratory pollen extractor having an enclosure in connection with a motorized vibrating device, wherein pollen is separated from flowering plants within the enclosure by the energy induced by the vibrations thereon.

Another object of the present invention is to provide a pollinator device that is adapted to spread extracted pollen dust using a handheld enclosure, the handheld enclosure having a sifting screen to communicate the pollen dust therethrough.

Another object of the present invention is to provide a vibrating pollinator that is battery-powered, permitting its use over extended areas without a tethered power source.

Yet another object of the present invention is to provide an embodiment of the device wherein a vibrating wand provides energetic input into a sifting bowl for separating and dispensing smaller quantities of pollen dust therefrom.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
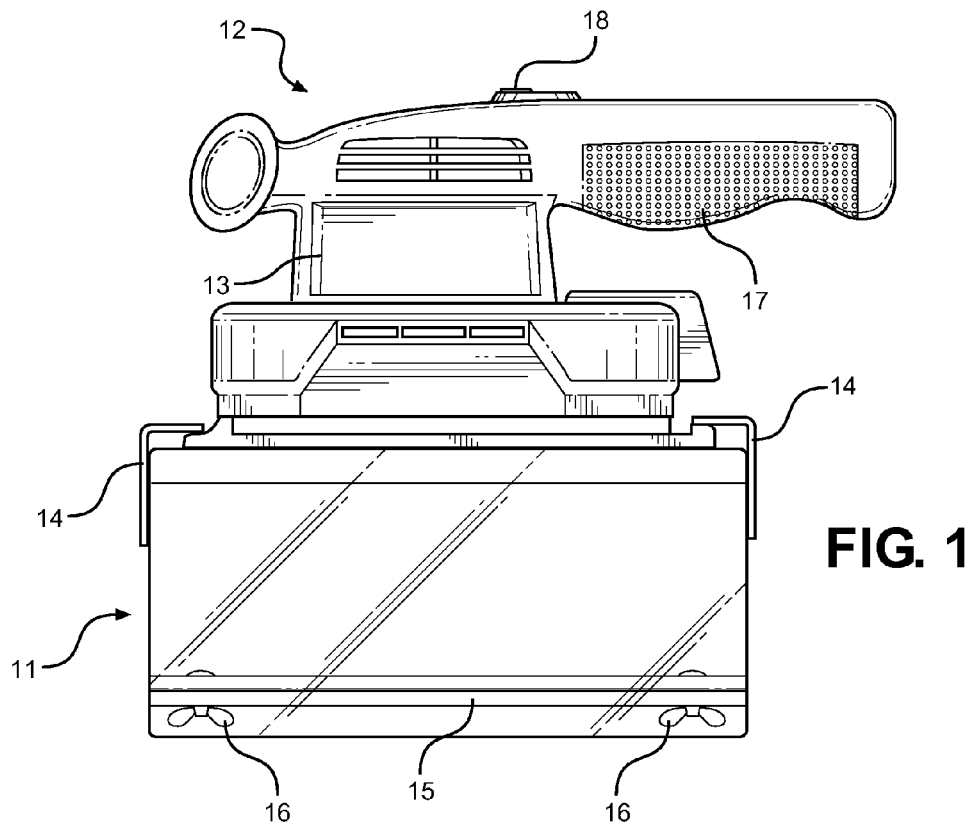
FIG. 1 shows a side view of the preferred embodiment of the present invention.

Reference is made herein to the attached drawings. Like reference numerals are used throughout the drawings to depict like or similar elements of the pollinator devices. For the purposes of presenting a brief and clear description of the present invention, the preferred embodiment will be discussed as used for separating and dispensing pollen dust from flowering plant specimens. The figures are intended for representative purposes only and should not be considered to be limiting in any respect.

Figure 5:
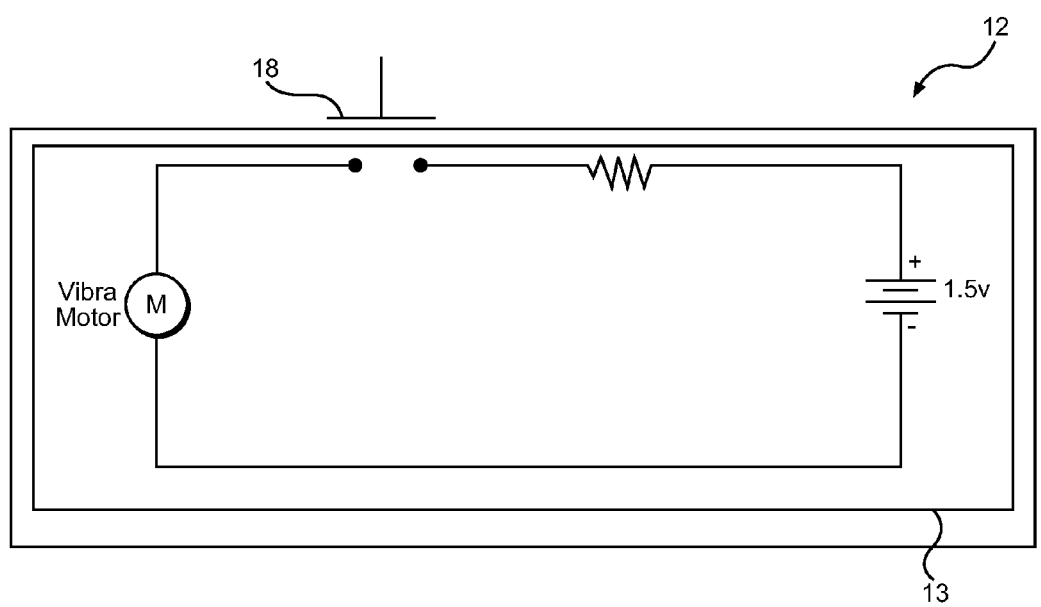
FIG. 5 shows a schematic diagram of the housing of the present invention.

Referring now to FIG. 1, there is shown a side view of the preferred embodiment of the present invention, wherein a pollen separator, sifter and pollinator device is provided. The device comprises a handheld portion 12 attaching to an enclosure 11 that is adapted to house a volume of flowering plants having pollen dust ready for extraction and dispensation. As shown in FIG. 5, the handheld portion 12 further comprises a housing 13 with an imbedded vibration motor, battery power and necessary internal circuitry to execute the motor, a power switch 18 that controls operation of the motor and a handle 17 for the user to grasp the assembly and control the operation of the device. The handheld portion 12 connects above a transparent enclosure 11. A pair of clip attachments 14 affixes the base of the vibration motor to the enclosure to ensure vibration energy is transmitted from the handheld portion and into the sidewalls of the enclosure. Within the enclosure, a plurality of flowering plants or pollen-containing articles is adapted to be stored. The induced vibration of the enclosure separates the pollen dust from the plants. Along the base of the enclosure 11 is a sifting screen 15 that is removably attached using a plurality of fasteners 16. As the pollen dust is separated from the plants, it collects along the base of the enclosure and can be dispensed through the sifting screen 15 onto a target plant specimen requiring fertilization. The user may shake the assembly to facilitate the sifting of the pollen through the screen, which communicates the pollen while preventing discrete objects, such as the larger plant articles, from leaving the enclosure 11.

Figure 2:
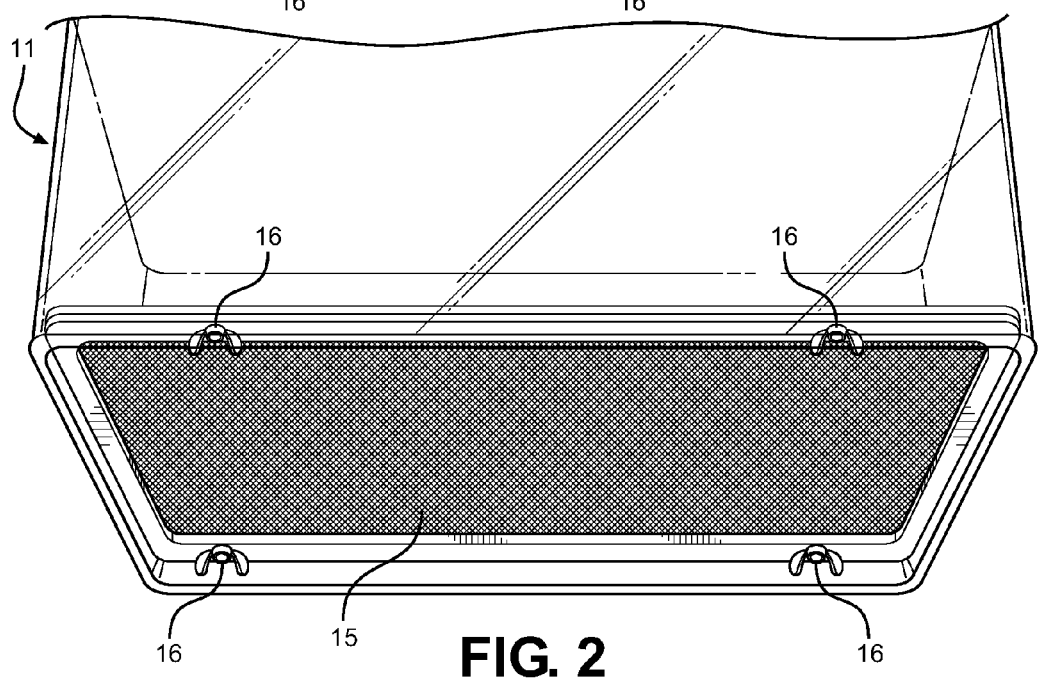
FIG. 2 shows an underside perspective view of the preferred embodiment of the present invention, wherein the enclosure and sifter screen is shown.

Referring now to FIG. 2, there is shown an underside perspective view of the preferred embodiment of the enclosure 11 and sifting screen 15. The screen 15 is a removable lower surface of the enclosure, which allows the user to load and unload specimen plants into the enclosure 11 for pollen extraction. The nature of the screen, whereby small apertures are provided along its surface, allows pollen dust to exit the enclosure after being liberated from its plant origin. The larger, macroscopic articles of the plant are contained within the enclosure 11 and subjected to a high level of vibration energy. The energy transmits through the enclosure and into the plants, which causes the pollen to loosen from the stamen or other pollen carrying members of the plants, either directly into the enclosure air volume or setting against the screen 15. As the device is shaken by the user, the pollen dust is communicated through the screen and onto a plant or surface therebelow. In this way, the user loads the enclosure with a plurality of pollen-generating plants, and uses the vibratory device to extract the pollen therefrom. The pollen can then be collected below the enclosure 11 or directly dispensed onto another plant desiring fertilization. A plurality of closure fasteners 16 secures the screen to the enclosure and ensures its fitment thereagainst.

Figure 3:
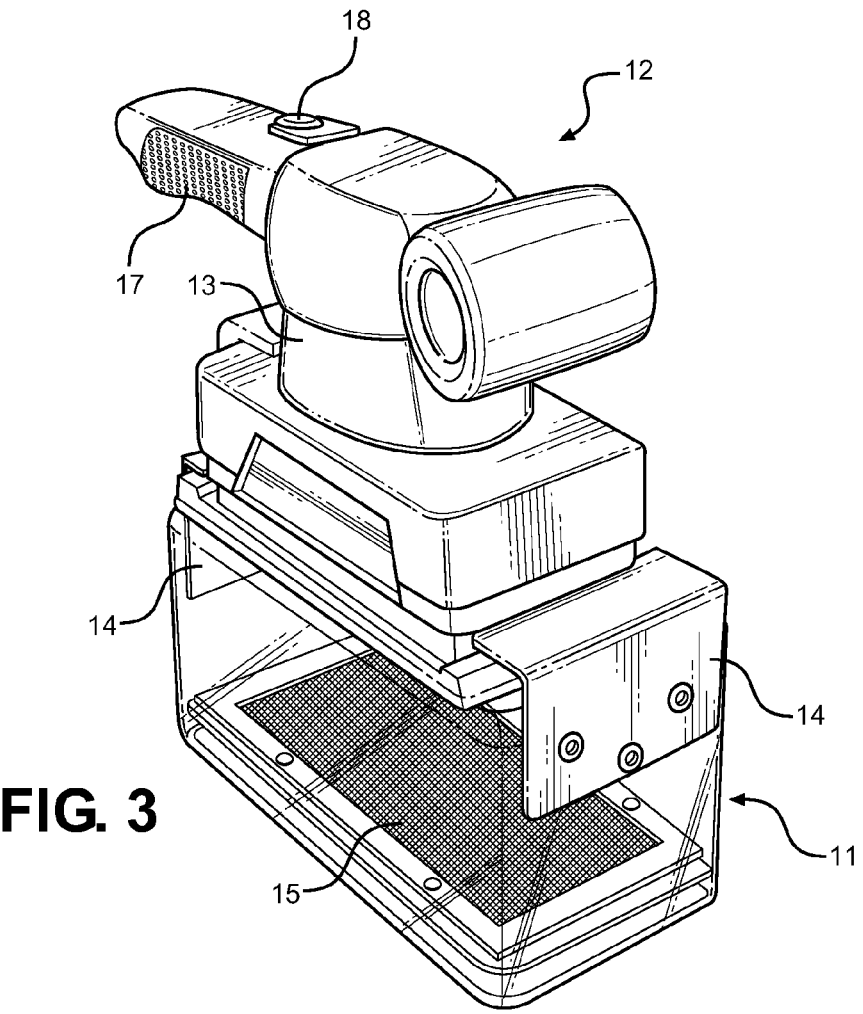
FIG. 3 shows an overhead perspective view of the preferred embodiment of the present invention.

Referring now to FIG. 3, there is shown an overhead perspective view of the preferred embodiment of the present invention. The handheld region 12 comprises a handle 17 for the user to grasp, along with an accessible power button 18 to initiate operation of the internal vibration motor within the handheld region housing 13. The handheld region attaches to the enclosure using a secure clip attachment, wherein during operation, the vibrations of the motor are translated directly into the enclosure 11 sidewalls and into the plants therein. In one embodiment, a pair of clips 14 on opposing sides of a rectangular enclosure 11 allows the handheld region to slide into position against the upper wall of the enclosure. Separation is only achieved by sliding the enclosure 11 and handheld region 12 in opposing lateral directions. Alternatives to this configuration are contemplated, as it is not desired to limit the disclosed invention to a particular design, but rather to disclose an operable embodiment wherein a handheld vibration means is connected to an enclosure for separating pollen dust from specimen plants held therein. The exact connection, design of the handheld region and the vibration motor are not limited to the FIGURES. A device having a vibration means, a means for connecting said motor to a collection of pollen-containing plants, and a means for sifting the pollen dust therefrom is disclosed.

Figure 4:
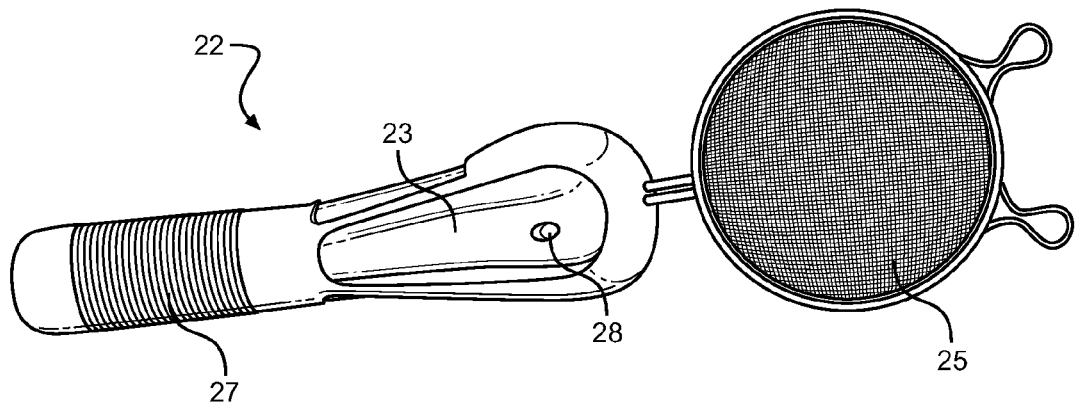
FIG. 4 shows an overhead perspective view of an alternate embodiment of the present invention.

Referring now to FIG. 4, there is shown an overhead perspective view of an alternate embodiment of the present invention. As with the preferred embodiment, a handheld vibrating motor attaches to a sifting screen; however, in this design, the motor 23 is housed within a handheld wand 22 having a grip 27 and a power switch 28. The wand 22 has a working distal end that transmits vibration energy into a sifting screen 25, which is utilized to hold a quantity of pollen generating plants. Separation of pollen dust from the plants is achieved using the same process as previously disclosed, wherein vibration of the plants allows pollen to separate and communicate through the mesh screen 25 for dispensation onto a desired plant or surface for collection. Imbedded batteries power the vibrating motor, which vibrates the screen 25 during operation. The user controls the operation of the motor using the power switch 28 on the handle portion.

In use an individual utilizes either embodiment of the device to separate pollen dust from a quantity of pollen generating plants. The process begins by placing the quantity of plants within the disclosed enclosure or within the sifting screen of the wand embodiment. The enclosure screen is secured closed and the user grips the handheld portion with one or two hands. The power switch activates the vibration motor, which sends high frequency vibration through the enclosure or screen of the wand to separate pollen from the quantity of plants. As the pollen is separated, it is communicated through the screen and onto an article below the device. The article may be a collection area for pollen, or preferably be a plant the user desires to fertilize with the pollen dust. The use of vibration allows for direct separation of pollen from its source, as opposed to existing devices that utilize a pressure or pump system to spread granular pollen dust that has previously been separated. The style of the handle, the type of vibrating motor and the attachment of the enclosure can vary as one skill in the art of vibratory devices and pollinators would see fit. It is not desired to limit the device to a particular design of a handheld portion, but rather to disclose a vibrating pollen separator, extractor and dispenser.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A pollen separator and dispenser, comprising:
   a handheld portion having a housing;
   a vibration motor enclosed in said housing of said handheld portion;
   a hollow enclosure having rectangular sidewalls, an upper termination, an open lower termination, and an interior volume for storing pollen-containing plant articles;
   said handheld portion removably connected to said upper termination of said enclosure via at least one fastener;
   wherein said handheld portion substantially covers said upper termination of said enclosure;
   said at least one fastener connected to opposing sides of said enclosure and said handheld portion; wherein said at least one fastener is an L-shaped clip having a first section that is perpendicular to a second section; said first section connected to said handheld portion; said second section connected to one of said sidewalls of said enclosure;
   a sifting screen removably attached to said lower termination of said enclosure;
   said vibration motor providing vibration input into said enclosure to separate pollen from said plant articles;
   said sifting screen adapted to dispense said pollen.

2. The pollen separator and dispenser of claim 1, wherein said handheld portion further comprises a handle and a power switch.

3. The pollen separator and dispenser of claim 2, wherein said handle is secured in place above said housing.

4. The pollen separator and dispenser of claim 1, wherein said sifting screen is removably attached to said lower termination of said enclosure via a plurality of closure fasteners.

5. The pollen separator and dispenser of claim 1, wherein said handheld portion is removably connected to said upper termination of said enclosure via said at least one fastener to permit vibration input from said vibration motor to said sidewalls of said enclosure.

6. The pollen separator and dispenser of claim 1, further comprising:
   a battery and electrical connections enclosed in said housing;
   said electrical connections adapted for operation of said vibration motor.

* * * * *